US012026075B2

(12) United States Patent
Gu et al.

(10) Patent No.: US 12,026,075 B2
(45) Date of Patent: Jul. 2, 2024

(54) POWER SUPPLY HEALTH CHECK SYSTEM AND METHOD THEREOF

(71) Applicant: ASUSTEK COMPUTER INC., Taipei (TW)

(72) Inventors: Cheng-Wei Gu, Taipei (TW); Shu-Chiao Liao, Taipei (TW); Ming-Hung Chung, Taipei (TW); Yao-Hsun Huang, Taipei (TW); Yuan-I Tseng, Taipei (TW); Hung-Ju Lin, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 32 days.

(21) Appl. No.: 18/073,300

(22) Filed: Dec. 1, 2022

(65) Prior Publication Data

US 2023/0350772 A1 Nov. 2, 2023

(30) Foreign Application Priority Data

Apr. 29, 2022 (TW) ................................. 111116347

(51) Int. Cl.
*G06F 11/273* (2006.01)
*G06F 1/3296* (2019.01)

(52) U.S. Cl.
CPC ........ *G06F 11/2733* (2013.01); *G06F 1/3296* (2013.01)

(58) Field of Classification Search
CPC ............................ G06F 11/2733; G06F 1/3296
See application file for complete search history.

(56) References Cited

U.S. PATENT DOCUMENTS 10,635,147 B2\* 4/2020 Kao ...................... H02J 7/0068
11,693,470 B2\* 7/2023 Srinivasan ................ G06F 1/28
713/320

FOREIGN PATENT DOCUMENTS

| CN | 103576098 B | 12/2016 |
| CN | 110222399 A | 9/2019 |
| CN | 111190922 A | 5/2020 |
| CN | 113589163 A | 11/2021 |
| CN | 114186184 A | 3/2022 |

\* cited by examiner

*Primary Examiner* — Nadeem Iqbal
(74) *Attorney, Agent, or Firm* — Muncy, Geissler, Olds & Lowe, P.C.

(57) ABSTRACT

A power supply health check system for checking a health state of an under-test power supply is provided. The under-test power supply supplies power to a main board which has a voltage signal during operation. The health check system includes a detecting module, a deep learning model, and a processing unit. The detecting module is electrically connected to the main board to detect the voltage signal and convert the voltage signal into a digital signal. The deep learning model is established by using frequency-domain voltage data of a plurality of healthy power. The processing unit is configured to: collect the digital signal and store the digital signal as under-test time-domain voltage data; convert the under-test time-domain voltage data into under-test frequency-domain voltage data; and calculate, based on the under-test frequency-domain voltage data and the deep learning model, a health indicator for determining the health state of the under-test power supply.

13 Claims, 4 Drawing Sheets

POWER SUPPLY HEALTH CHECK SYSTEM AND METHOD THEREOF

CROSS-REFERENCE TO RELATED APPLICATION

This application claims the priority benefit of Taiwan application serial No. 111116347, filed on Apr. 29, 2022. The entirety of the above-mentioned patent application is hereby incorporated by reference herein and made a part of the specification.

BACKGROUND OF THE INVENTION

Field of the Invention

The disclosure relates to a power supply health check system and a method thereof.

Description of the Related Art

In a computer host, a power supply is configured to convert mains electricity into various electrical energy required for operation of a computer system and supply the various electrical energy to various different components such as a main board, a hard disk, and a display card in the computer host. Therefore, a health state of the power supply has a significant impact on the operation of the computer system.

However, conventionally, an output voltage of the power supply can only be measured by using an electric meter or is determined manually by reading an operating voltage in a basic input-output system (BIOS) of a computer, and there lacks an effective and accurate method that can check a possible deterioration of the power supply.

BRIEF SUMMARY OF THE INVENTION

The disclosure discloses a power supply health check system for checking a health state of an under-test power supply. The under-test power supply supplies power to a main board. The main board has a voltage signal during operation. The health check system includes a detecting module, a deep learning model, and a processing unit. The detecting module is electrically connected to the main board and is configured to detect the voltage signal and convert the voltage signal into a digital signal. The deep learning model is established by using frequency-domain voltage data of a plurality of healthy power supplies as training data. The processing unit is configured to: collect the digital signal as under-test time-domain voltage data; convert the under-test time-domain voltage data into under-test frequency-domain voltage data; calculate a health indicator based on the under-test frequency-domain voltage data and the deep learning model; and determine the health state of the under-test power supply based on the health indicator.

The disclosure also discloses a power supply health check method for checking a health state of an under-test power supply by using a deep learning model. The deep learning model is established by using frequency-domain voltage data of a plurality of healthy power supplies as training data. The under-test power supply supplies power to a main board. The main board has a voltage signal during operation. The check method includes: electrically connecting a detecting module to the main board; detecting the voltage signal and converting the voltage signal into a digital signal by using the detecting module; collecting the digital signal and storing the digital signal as under-test time-domain voltage data; converting the under-test time-domain voltage data into under-test frequency-domain voltage data; calculating a health indicator based on the under-test frequency-domain voltage data and the deep learning model; and determining the health state of the under-test power supply based on the health indicator.

The detecting module in the disclosure detects the voltage signal of the main board during operation through a detection pin, converts the voltage signal into the digital signal, and then sends the digital signal back to the main board for processing and display. In this way, a voltage change of the main board during operation is tracked without using an external oscilloscope.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It is to be noted that all of the drawings use very simplified forms and imprecise proportions, only being used for assisting in conveniently and clearly explaining the objective of the embodiments of the disclosure.

Figure 1:
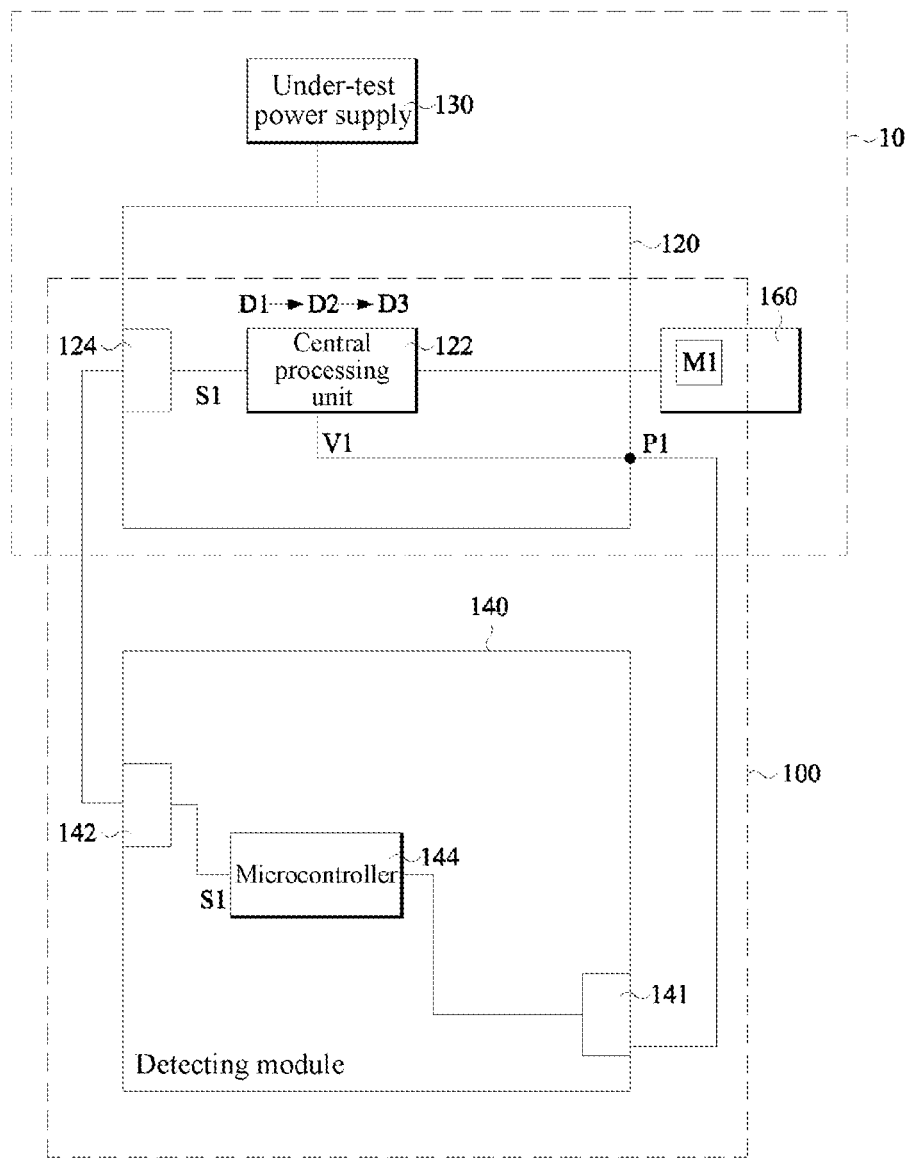
FIG. 1 is a schematic block diagram of a power supply health check system according to an embodiment of the disclosure.

FIG. 1 is a schematic block diagram of a power supply health check system according to an embodiment of the disclosure. A power supply health check system 100 in this embodiment is configured to check a health state of a power supply of a computer host 10. The computer host 10 includes a main board 120 and an under-test power supply 130. The under-test power supply 130 supplies power to the main board 120. The main board 120 has at least one voltage signal V1 during operation. In an embodiment, the main board 120 includes a central processing unit 122, and the voltage signal V1 carried by the foregoing main board 120 during operation is a core voltage Vcore of the central processing unit 122, an output-input voltage Vccin of the central processing unit 122 or a system agent voltage SA of the central processing unit 122. In an embodiment, if the main board 120 is electrically connected to a display card (not shown in the figure), the voltage signal V1 carried by the foregoing main board 120 during operation is also an input voltage of the display card.

As shown in the figure, the health check system 100 includes a detecting module 140, a deep learning model M1, and a processing unit. In this embodiment, the central processing unit 122 on the main board 120 is directly used as a processing unit of the health check system 100. However, the disclosure is not limited thereto. In other embodiments, another processing component such as a graphics processing unit on the main board 120 or a processing component of another electronic device different from the computer host 10 is also used as a processing unit of the health check system 100.

The detecting module 140 is detachably mounted on the main board 120 to detect the voltage signal V1 on the main board 120 and convert the voltage signal V1 into a digital signal S1 for output.

In an embodiment, the detecting module 140 includes a detection pin 141, a connector 142, and a microcontroller 144. The detection pin 141 is configured to detachably connect to a voltage detection contact P1 on the main board 120 to detect the voltage signal V1 of the main board 120. The microcontroller 144 is electrically connected to the detection pin 141 and configured to convert the voltage signal V1 into the digital signal S1. The connector 142 is electrically connected to the microcontroller 144 and configured to output the digital signal S1. In an embodiment, the connector 142 is a universal serial bus (USB) connector.

A user chooses to connect the connector 142 of the detecting module 140 to a corresponding connector 124 on the main board 120, so that the central processing unit 122 on the main board 120 is used as the processing unit of the health check system 100 to receive the digital signal S1 to perform subsequent processing, or chooses to connect the connector 142 of the detecting module 140 to another electronic device to perform processing. The former is adopted in this embodiment.

The deep learning model M1 is established by using frequency-domain voltage data of a plurality of healthy power supplies as training data.

In an embodiment, these healthy power supplies are screened out from a plurality of power supply samples in a feature analysis manner. Specifically, each power supply sample has training spectrum voltage data, and the feature analysis manner is analyzing frequency-domain voltage data samples of the power supply samples through at least one in a group consisting of a full-deviation, skewness, kurtosis, average, and a standard-deviation to screen out a healthy power supply.

Figure 2:
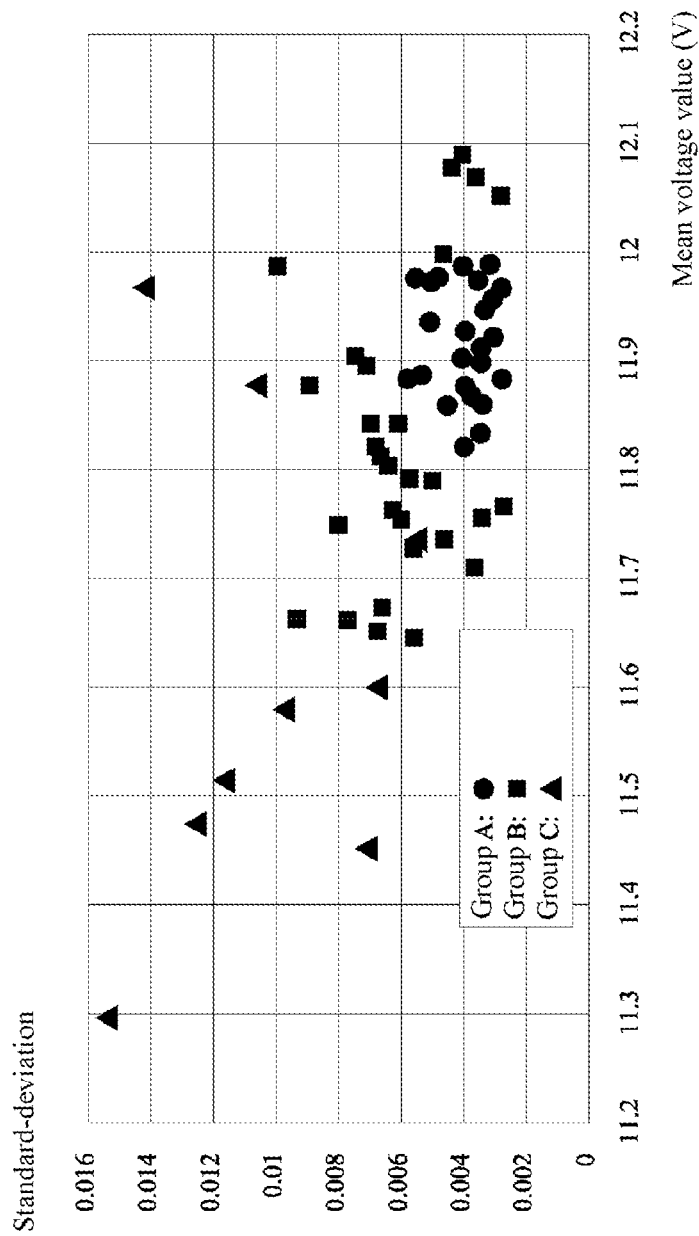
FIG. 2 is a scatter plot showing a manner of screening out a healthy power supply according to an embodiment of the disclosure.

FIG. 2 is a scatter plot showing a manner of screening out a healthy power supply according to an embodiment of the disclosure. The scatter plot shows feature distributions of a plurality of power supply samples, with each dot representing one power supply sample. An X-axis represents a mean voltage value, and a Y-axis represents a standard-deviation.

In this embodiment, these power supply samples are divided into a plurality of groups (Group A, Group B, and Group C in the figure) according to a distribution status of these power supply samples on the scatter plot. The Group A has a mean value that is closer to a set voltage value of 12V and a smaller standard-deviation. Therefore, the group are determined as healthy power supplies.

Referring to FIG. 1 again, the deep learning model M1 is preloaded into a non-transitory memory medium such as a random access memory (RAM), a solid-state drive or a cloud storage space accessible by the central processing unit 122. In an embodiment, the deep learning model M1 is directly stored in a storage device 160 in the computer host 10 for easy access by the central processing unit 122.

The central processing unit 122 is electrically connected to the detecting module 140 to obtain the digital signal S1 and executes an instruction to perform a data collection step, a frequency-domain conversion step, and a health indicator calculation step. In an embodiment, the foregoing instruction is preloaded into a non-transitory memory medium such as a RAM, a solid-state drive or a cloud storage space accessible by the central processing unit 122.

In the data collection step, the central processing unit 122 collects the digital signal S1 from the detecting module 140 and stores the digital signal as under-test time-domain voltage data D1. In an embodiment, the under-test time-domain voltage data D1 collected in the data collection step is stored in the storage device 160 such as a RAM or a solid-state drive in the computer host 10.

In the frequency-domain conversion step, the central processing unit 122 converts the under-test time-domain voltage data D1 into under-test frequency-domain voltage data D2. In an embodiment, in the frequency-domain conversion step, the under-test time-domain voltage data D1 is converted into the under-test frequency-domain voltage data D2 by Fast Fourier transform (FFT).

In the health indicator calculation step, the central processing unit 122 applies the under-test frequency-domain voltage data D2 to the deep learning model M1 to calculate a health indicator D3. A health state of the under-test power supply 130 is determined through the health indicator D3 calculated in the health indicator calculation step.

In an embodiment, a threshold is set in the health indicator calculation step. The threshold is set and generated by using the deep learning model M1 and the training data of the healthy power supplies. In the health indicator calculation step, the central processing unit 122 compares the calculated health indicator D3 with the threshold to determine the health state of the under-test power supply 130 and then gives a recommendation on whether a power supply needs to be replaced or repaired.

Figure 3:
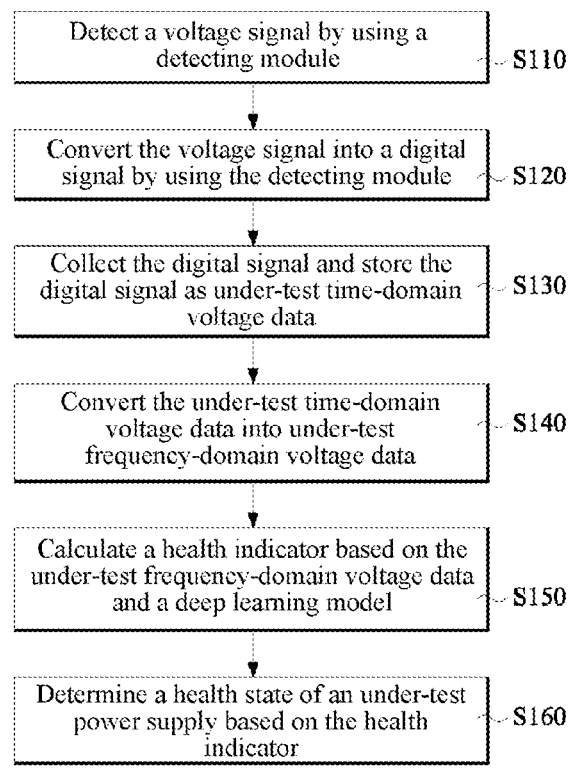
FIG. 3 is a flowchart of a power supply health check method according to an embodiment of the disclosure.

FIG. 3 is a flowchart of a power supply health check method according to an embodiment of the disclosure. The health check method is operated in conjunction with the health check system 100 shown in FIG. 1. The health check method includes the following steps.

First, as described in step S110, the voltage signal V1 is detected by using the detecting module 140. Then, as described in step S120, the voltage signal V1 is converted into the digital signal S1 by using the detecting module 140. In an embodiment, referring to FIG. 1, in step S110, the detection pin 141 of the detecting module 140 is electrically connected to the voltage detection contact P1 of the main board 120 to detect the voltage signal V1 carried by the main board 120 during operation.

Next, as described in step S130, the digital signal S1 is collected and stored as the under-test time-domain voltage data D1.

Then, as described in step S140, the under-test time-domain voltage data D1 is converted into the under-test frequency-domain voltage data D2.

Next, as described in step S150, the health indicator D3 is calculated based on the under-test frequency-domain voltage data D2 and the deep learning model M1.

Next, as described in step S160, the health state of the under-test power supply 130 is determined based on the health indicator D3.

In an embodiment, referring to FIG. 1, the detecting module 140 is electrically connected to the main board 120 and transmits the digital signal S1 to the main board 120 to perform processing procedures of steps S130 to S160. Steps S130 to S160 are performed by the central processing unit 122 on the main board 120. However, the foregoing embodiment is not limited thereto.

Figure 4:
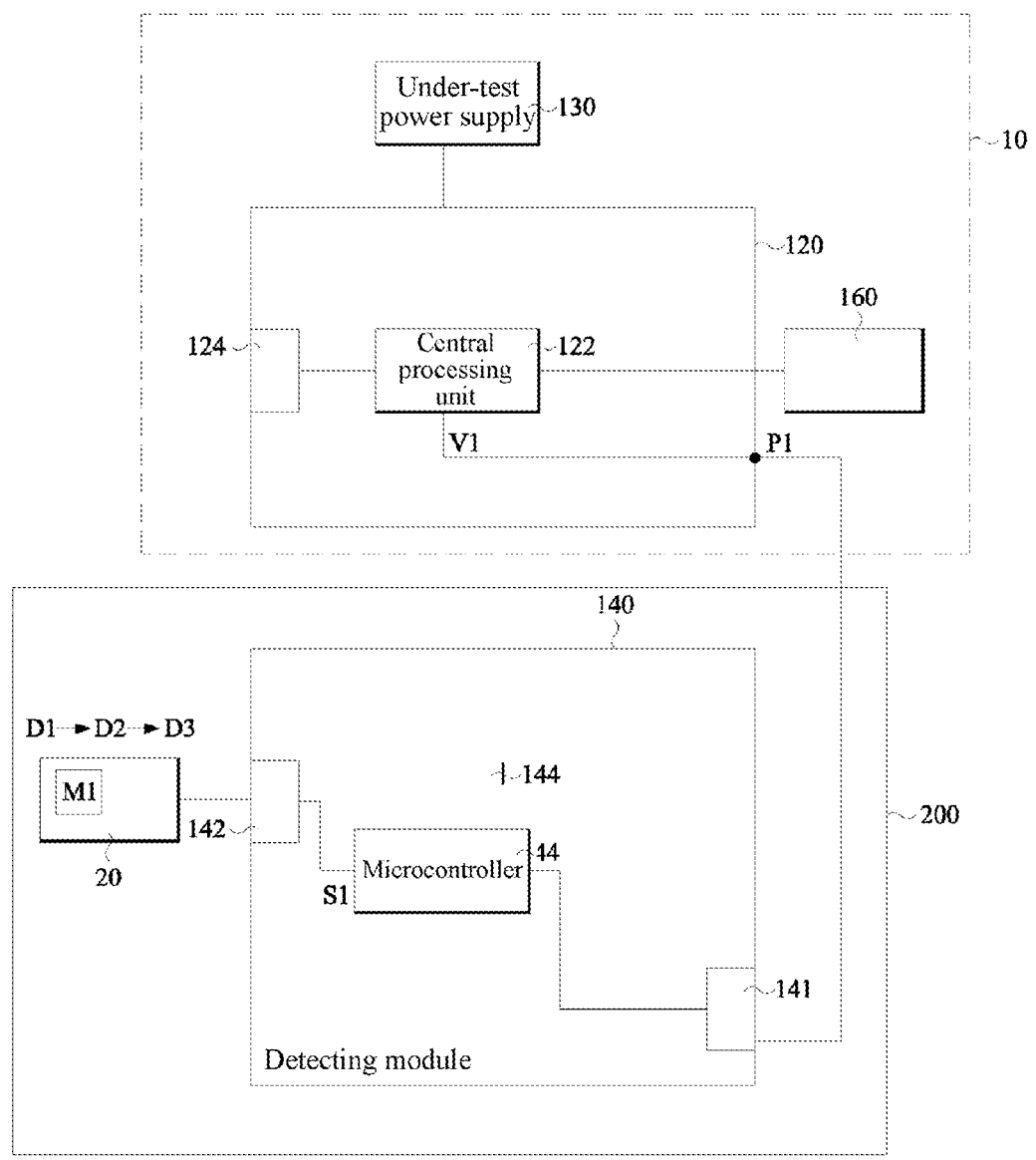
FIG. 4 is a schematic block diagram of a power supply health check system according to another embodiment of the disclosure.

FIG. 4 is a schematic block diagram of a power supply health check system 200 according to another embodiment of the disclosure. In this embodiment, the detecting module 140 is electrically connected to another electronic device 20 such as a tablet computer by the connector 142. Instead of being transmitted to the main board 120 and processed by the central processing unit 122 of the main board 120 as shown in FIG. 1, the digital signal S1 generated by the detecting module 140 is transmitted to the electronic device 20 for processing. In this case, it is avoided that, in a health check process of a power supply, a load of the under-test power supply 130 increases due to a computing demand of the main board 120.

The detecting module 140 in the disclosure detects the voltage signal V1 of the main board 120 during operation through a detection pin, converts the voltage signal V1 into the digital signal S1, and then sends the digital signal S1 back to the main board 120 for processing and display on a display (not shown in the figure) connected to the computer host 10. In this way, a voltage change of the main board 120 during operation is tracked without using an external oscilloscope.

The above is merely exemplary embodiments of the disclosure, and does not constitute any limitation on the disclosure. Any form of equivalent replacement or modification made by a person skilled in the art to the technical means and technical content disclosed in the disclosure without departing from the scope of the technical means of the disclosure is content that does depart from the technical means of the disclosure and still fall within the protection scope of the disclosure.

What is claimed is:

1. A power supply health check method for checking a health state of an under-test power supply by using a deep learning model which is established by using frequency-domain voltage data of a plurality of healthy power supplies as training data, the under-test power supply supplying power to a main board, the main board having a voltage signal during operation, the power supply health check method comprising:
    detecting the voltage signal by using a detecting module;
    converting the voltage signal into a digital signal by using the detecting module;
    collecting the digital signal and storing the digital signal as under-test time-domain voltage data;
    converting the under-test time-domain voltage data into under-test frequency-domain voltage data;
    calculating a health indicator based on the under-test frequency-domain voltage data and the deep learning model; and
    determining the health state of the under-test power supply based on the health indicator.

2. The power supply health check method according to claim 1, wherein the main board comprises a central processing unit, and the voltage signal is a core voltage of the central processing unit, an output-input voltage of the central processing unit or a system agent voltage of the central processing unit.

3. The power supply health check method according to claim 1, wherein the main board is electrically connected to a display card, and the voltage signal is an input voltage of the display card.

4. The power supply health check method according to claim 1, wherein the plurality of healthy power supplies is screened out from a plurality of power supply samples in a feature analysis manner.

5. The power supply health check method according to claim 4, wherein each power supply sample has training spectrum voltage data, and the feature analysis manner is analyzing frequency-domain voltage data samples of the power supply samples through at least one in a group consisting of a full-deviation, skewness, kurtosis, average, and a standard-deviation.

6. The power supply health check method according to claim 1, wherein the step of converting the under-test time-domain voltage data into the under-test frequency-domain voltage data is performed by using Fast Fourier transform (FFT).

7. The power supply health check method according to claim 1, wherein the main board comprises a memory, and the under-test time-domain voltage data is stored in the memory.

8. The power supply health check method according to claim 7, wherein the detecting module transmits the digital signal to the main board through a universal serial bus (USB) interface.

9. The power supply health check method according to claim 1, further comprising setting a threshold by using the deep learning model and the training data.

10. The power supply health check method according to claim 9, wherein the step of determining the health state of the under-test power supply based on the health indicator comprises comparing the health indicator with the threshold.

11. The power supply health check method according to claim 1, wherein the deep learning model is preloaded on the main board.

12. The power supply health check method according to claim 1, wherein the detecting module comprises a detection pin, a connector, and a microcontroller, wherein the detection pin is configured to detect the voltage signal, the microcontroller is configured to convert the voltage signal into the digital signal, and the connector is configured to output the digital signal.

13. A power supply health check system for checking a health state of an under-test power supply, the under-test power supply supplying power to a main board, the main board having a voltage signal during operation, the power supply health check system comprising:
    a detecting module, electrically connected to the main board and configured to detect the voltage signal and convert the voltage signal into a digital signal;
    a deep learning model, established by using frequency-domain voltage data of a plurality of healthy power supplies as training data; and
    a processing unit, configured to:
        collect the digital signal and store the digital signal as under-test time-domain voltage data;
        convert the under-test time-domain voltage data into under-test frequency-domain voltage data;
        calculate a health indicator based on the under-test frequency-domain voltage data and the deep learning model; and
        determine the health state of the under-test power supply based on the health indicator.

* * * * *